Patented Jan. 16, 1923.

1,442,485

UNITED STATES PATENT OFFICE.

WARREN K. LEWIS, OF NEWTON, MASSACHUSETTS, ASSIGNOR TO THE GOODYEAR TIRE & RUBBER COMPANY, OF AKRON, OHIO, A CORPORATION OF OHIO.

METHOD OF PRODUCING FINE POWDERS.

No Drawing.   Application filed August 13, 1918.   Serial No. 249,639.

*To all whom it may concern:*

Be it known that I, WARREN K. LEWIS, a citizen of the United States, residing at Newton, in the county of Middlesex and State of Massachusetts, have invented a new and useful Improvement in the Method of Producing Fine Powders, of which the following is a specification.

My invention relates to the art of preparing fine powders and will be fully understood from the following specification.

It has long been recognized that powders prepared by subliming or precipitating from the gaseous state are finer than those prepared by any mechanical grinding method. As an example, zinc white or zinc oxide may be mentioned. This substance is commonly prepared by roasting a zinc ore directly with a body of carbonaceous fuel, thereby effecting the simultaneous reduction of the ore and volatilization of the elemental zinc. The zinc vapors thus produced are led to a diffusion chamber in which they are admixed with air. The zinc vapors here unite with or burn in the air, producing zinc oxide in the form of an impalpable powder which is collected by filtration through dust bags. For the production of an especially pure and fine zinc oxide, the process is modified to the extent that pure spelter is heated to the boiling point in a retort, and the zinc vapors lead therefrom into the diffusion chamber where they are burnt or oxidized, as above described.

From theoretical considerations, it would appear that the zinc oxide powder as originally produced by either of these methods would approach a molecular condition of fineness since it is reasonable to suppose that the actual oxidation taking place in the gaseous phase produces primarily single and separate molecules of zinc oxide. As collected, however, the powder, while very fine, does not by any means approach this molecular condition and in fact, it is only by the greatest care and skill that a powder may be obtained sufficiently fine for use in the manufacture of high grade paints. It is, therefore, apparent that after their formation, the zinc oxide molecules rapidly associate into larger masses.

I have discovered that by a slight modification of the process described, it is possible to produce a powder of a degree of fineness more nearly approaching the molecular condition. At the same time, my process will usually effect other improvements as will be apparent from the following.

In brief, my invention resides in the dilution of the zinc vapors and oxygen with a very large proportion of inert gas, to the primary end that the re-action between the zinc and oxygen may take place in what may be described as a dilute gaseous solution. Under such circumstances, the molecules of zinc oxide as they are formed by the re-action, will be much more widely separated from one another, and furthermore the heat of the re-action or combustion will be absorbed by the diluting atmosphere, so that the temperature of the nascent oxide will be very much reduced. There is evidence that both of these conditions will contribute to retard the association of the individual molecules into large aggregates.

One of the improved results mentioned, i. e., the reduction of temperature of the re-action, may be further benefited by the substitution of a gas such as flue gas containing carbon dioxide for a truly inert gas. The zinc vapors may here become oxidized by carbon dioxide, reducing the latter to the monoxide with a considerably smaller heat of re-action than would necessarily be developed were the zinc to combine directly with free oxygen.

In order to obtain the most advantageous results from an operative standpoint, it may be desirable to introduce the diluting gas into the distilling retort where the zinc vapors are produced by direct distillation of pure spelter. Here the diluting gas current will, in accordance with Dalton's laws of vapor pressure, effect the volatilization of the zinc at a temperature which may be very much below the atmospheric boiling point of the zinc. This will reduce the wear on the retort and will further benefit the entire process since the zinc vapors, being evolved at a lower temperature, will carry less heat and in effect, further lower the temperature in the diffusion chamber. It may be remarked that this last-named improved effect approaches the result obtainable by vacuum distillation. The same effect is also obtainable by introducing the diluent gas into the reducing furnace, but the best results are secured by admitting it to the flue from that furnace in order to avoid the slowing-up of the reduction by cooling.

It will be apparent that in accordance with the principles of the present invention, the degree of fineness of the resultant powder will be a function of the extent to which the dilution is carried out in the diffusion chamber. For the production of a zinc powder of a degree of fineness suitable for the most exacting service which is now known, it is suggested that a dilution of from 100 to 200 volumes will be found proper. In general, the greater the degree of dilution, the finer the resultant product, with the practical limitation that too great dilution will involve an unduly large apparatus and may result in an increased percentage of loss of product.

As set forth above, a preferred process according to my invention, taking the production of zinc oxide as an example, consists in the introduction of 100 to 200 volumes of combustion gases (which may be the gases passing through the dust filters beyond the diffusion chamber, this re-use of the gases resulting in a saving of zinc loss), into the diffusion chamber, as by a blower or fan, a portion of such diluting gas being introduced with the zinc vapors and a portion with the air.

It will be apparent from the foregoing that the process above described as to its general features, is applicable to a wide variety of metallurgical processes involving the production of fine powders by subliming or condensing, or precipitating from the gaseous phase. Thus the process is applicable to the production of basic sulphite of lead or sublimed lead, the dilution being carried out just before or during precipitation. Arsenic and antimony sulphides which are distilled from retorts for use as pigments or fillers may likewise be improved in quality in the same manner. It will be understood that while I have described in considerable detail a preferred method of carrying out my improved process as applied to one specific material, the invention is not to be regarded as limited to the detailed method described, except in so far as such limitations are included within the terms of the accompanying claims in which it is my intention to claim all novelty inherent in my invention as broadly as is permissible in view of the prior art.

What I claim as new and desire to secure by Letters Patent is:—

1. The improvement in the art of producing fine powders by precipitation from gases, which consists in bringing together the reacting gases under reacting conditions in the presence of a relatively large diluting volume of inert gas, whereby the precipitated solid compound is secured in finely divided form.

2. The improvement in the art of producing fine powders by the oxidation of metallic vapors which consists in causing such oxidation to take place in a gaseous medium in which the oxygen content is relatively small.

3. The improvement in the art of producing fine powders by the oxidation of metallic vapors which consists in carrying out the said oxidation in a gaseous medium consisting of a relatively small proportion of oxygen diluted with a relatively large proportion of combustion gas.

4. The improvement in the art of producing zinc oxide which consists in continuously introducing a relatively large proportion of inert gas into the diffusion chamber, whereby the oxidation of the zinc vapors takes place in a dilute gaseous medium.

5. The improvement in the art of producing zinc oxide which consists in introducing a relatively large volume of inert gas into the diffusion chamber and mixed with the air entering the said chamber.

6. The improvement in the art of producing zinc oxide which consists in introducing a relatively large volume of combustion gases into the air entering the diffusion chamber.

7. The improvement in the art of producing zinc oxide by distillation of spelter which consists in introducing a relatively large volume of inert gas into the distillatory retort and causing said gas to mix with and pass into the diffusion chamber with the evolved zinc vapors.

8. The method of producing zinc oxide which consists in continuously re-introducing into the diffusion chamber a relatively large proportion of the gases passing from the said chamber.

WARREN K. LEWIS.

Witness:
R. S. TWYNER.